US008524853B2

(12) United States Patent
Gibon et al.

(10) Patent No.: US 8,524,853 B2
(45) Date of Patent: Sep. 3, 2013

(54) SEGMENTED POLYARYLENE ETHER BLOCK COPOLYMERS

(75) Inventors: Cecile Gibon, Mannheim (DE); Martin Weber, Maikammer (DE); Reinoud J. Gaymans, Enschede (NL); Ranimol Stephen, Kerala (IN)

(73) Assignee: BASF SE (DE)

( * ) Notice: Subject to any disclaimer, the term of this patent is extended or adjusted under 35 U.S.C. 154(b) by 0 days.

(21) Appl. No.: 13/376,901

(22) PCT Filed: May 31, 2010

(86) PCT No.: PCT/EP2010/057521
§ 371 (c)(1),
(2), (4) Date: Dec. 8, 2011

(87) PCT Pub. No.: WO2010/142548
PCT Pub. Date: Dec. 16, 2010

(65) Prior Publication Data
US 2012/0108693 A1    May 3, 2012

(30) Foreign Application Priority Data

Jun. 8, 2009 (EP) .................................... 09162164

(51) Int. Cl.
*C08G 8/02* (2006.01)
(52) U.S. Cl.
USPC ........... 528/125; 528/391; 528/184; 528/623; 528/624; 525/344; 525/353; 521/180
(58) Field of Classification Search
USPC ......... 528/125, 391, 184, 623, 624; 525/344, 525/353; 521/180
See application file for complete search history.

(56) References Cited

U.S. PATENT DOCUMENTS

| | | |
|---|---|---|
| 2006/0217500 A1 | 9/2006 | Gaymans et al. |
| 2010/0184898 A1 | 7/2010 | Weber et al. |
| 2010/0197859 A1 | 8/2010 | Weber et al. |
| 2010/0286303 A1 | 11/2010 | Weber et al. |
| 2011/0155309 A1 | 6/2011 | Steininger et al. |
| 2011/0201747 A1 | 8/2011 | Weber et al. |
| 2011/0218294 A1 | 9/2011 | Weber et al. |
| 2011/0224386 A1 | 9/2011 | Weber et al. |
| 2011/0237693 A1 | 9/2011 | Weber et al. |
| 2011/0237694 A1 | 9/2011 | Weber et al. |
| 2011/0244743 A1 | 10/2011 | Scherzer et al. |
| 2011/0251337 A1 | 10/2011 | Weber et al. |
| 2011/0294912 A1 | 12/2011 | Weber et al. |
| 2012/0083541 A1 | 4/2012 | Khvorost et al. |
| 2012/0083579 A1 | 4/2012 | Weber et al. |
| 2012/0088048 A1 | 4/2012 | Scherzer et al. |
| 2012/0107509 A1 | 5/2012 | Scherzer et al. |
| 2012/0149796 A1 | 6/2012 | Weber et al. |
| 2012/0252962 A1 | 10/2012 | Weber et al. |

FOREIGN PATENT DOCUMENTS

| | | |
|---|---|---|
| EP | 1253164 A1 | 10/2002 |
| WO | WO-91/13930 A1 | 9/1991 |
| WO | WO-2011/020823 A1 | 2/2001 |
| WO | WO-03/070806 A1 | 8/2003 |
| WO | WO-2009/000741 A1 | 12/2008 |
| WO | WO-2009/030620 A1 | 3/2009 |
| WO | WO-2009/062923 A3 | 7/2009 |
| WO | WO-2010026160 A1 | 3/2010 |
| WO | WO-2010/046328 A1 | 4/2010 |
| WO | WO-2010057822 A1 | 5/2010 |
| WO | WO-2010069813 A1 | 6/2010 |
| WO | WO-2010/142585 A1 | 12/2010 |
| WO | WO-2010/146052 A1 | 12/2010 |
| WO | WO-2011/009798 A1 | 1/2011 |
| WO | WO-2011/003900 A3 | 4/2011 |
| WO | 2783940 A1 | 6/2011 |
| WO | WO-2011/073196 A1 | 6/2011 |
| WO | WO-2011/073197 A1 | 6/2011 |
| WO | WO-2011/107389 A1 | 9/2011 |
| WO | WO-2011/117085 A1 | 9/2011 |
| WO | WO-2011/117153 A1 | 9/2011 |
| WO | WO-2011/147758 A1 | 12/2011 |

OTHER PUBLICATIONS

Hedrick et al., "Chemical modification of matrix resin networks with engineering thermoplastics: 1. Synthesis, morphology, physical behaviour, and toughening mechanisms of poly (arylene ether suplhone) modified epoxy networks", *Polymer*, vol. 32, No. 11, (1991), p. 2020-2032.
Husken, et al., "Segmented blockcopolymers with uniform amide segments", *Polymer*, vol. 45, (2004), p. 4837-4843.
International Search Report for PCT/EP2010/057521, mailed Aug. 12, 2010.
International Preliminary Report on Patentability for PCT EP2010/057521, date of issuance Dec. 12, 2011.
Krigsman et al., "Segmented Copolymers of Uniform Tetra-amide Units and Poly(Phenylene Oxide) by Direct Coupling", *Journal of Applied Polymer Science*, vol. 103, (2007), p. 512-518.
Raghava, R.S., "Role of Matrix-Particle Interface Adhesion on Fracture Toughness of Dual Phase Epoxy-Polyethersulfone Blend", *Journal of Polymer Science*, vol. 25, (1987), p. 1017-1031.

*Primary Examiner* — Shane Fang
(74) *Attorney, Agent, or Firm* — Novak Druce Connolly Bove + Quigg LLP

(57) ABSTRACT

The present invention relates to polyarylene ether block copolymers according to the general formula A-K—X—K-A, where —X— is a polyarylene ether segment with number-average molar mass of at least 5000 g/mol, and A- is a segment of the general structure $R^2NH—(R^1—NH—CO—Ar—CO—NH)_n—R^1—NH—$, in which $R^1$ is a linear or branched alkylene group having from 2 to 12 carbon atoms and Ar is an arylene group having from 6 to 18 carbon atoms, and $R^2$ is selected from aryloyl, alkyloyl, and H, and in which the number average of n is from 1 to 3, and there is a coupling group K of the structure —CO—$Ar^3$—CO— linking each A to X, in which $Ar^{13}$ is an aromatic group having from 6 to 18 carbon atoms. The present invention also relates to a process for the production of the polyarylene ether block copolymers of the invention, to polymer compositions comprising the polyarylene ether block copolymers of the invention, and also to the use thereof for the production of moldings, of films, of fibers, or of foams.

18 Claims, No Drawings

SEGMENTED POLYARYLENE ETHER BLOCK COPOLYMERS

CROSS-REFERENCE TO RELATED APPLICATIONS

This application is a national stage application (under 35 U.S.C. §371) of PCT/EP2010/057521, filed May 31, 2010, which claims benefit of European Application No. 09162164.9, filed Jun. 8, 2009.

BACKGROUND OF THE INVENTION

The present invention relates to polyarylene ether block copolymers according to the general formula A-K—X—K-A, where —X— is a polyarylene ether segment with number-average molar mass of at least 5000 g/mol, and A- is a segment of the general structure $R^2NH$—$(R^1$—NH—CO—Ar—CO—NH$)_n$—$R^1$—NH—, in which $R^1$ is a linear or branched alkylene group having from 2 to 12 carbon atoms and Ar is an arylene group having from 6 to 18 carbon atoms, and $R^2$ is selected from aryloyl, alkyloyl, and H, and in which the number average of n is from 1 to 3, and there is a coupling group K of the structure —CO—$Ar^3$—CO— linking each A to X, in which $Ar^3$ is an aromatic group having from 6 to 18 carbon atoms.

The present invention also relates to a process for the production of the polyarylene ether block copolymers of the invention, to polymer compositions comprising the polyarylene ether block copolymers of the invention, and also to the use thereof for the production of moldings, of films, of fibers, or of foams.

Polyarylene ethers are engineering thermoplastics, and their high heat resistance and high chemicals resistance leads to their use in very demanding applications. The literature has also disclosed that functionalized polyarylene ethers can be used as impact modifiers in thermoset matrices (R. S. Raghava, J. Polym. Sci., Part B: Polym. Phys., 25, (1987) 1017; J. L. Hedrick, I. Yilgor, M. Jurek, J. C. Hedrick, G. L. Wilkes, J. E. McGrath, Polymer, 32 (1991), 2020).

However, the stress-cracking resistance and solvent resistance of polyarylene ethers is unsatisfactory for many applications.

Husken et al., Polymer 45 (2004), 4837-4843 describe segmented block copolymers having uniform amide segments, composed of poly(tetramethylene oxide) segments and of tetramide segments.

WO 03/070806 describes segmented block copolymers which are composed of amide segments having at least 3 amide groups and of segments based on polymers with high glass transition temperature. The block copolymers have a multiblock structure which links the segments mentioned to one another in alternation. The segmented structure leads to rapid crystallization from the melt.

However, given comparable mechanical properties, the improvement that results from this type of segmented multi-block structure in terms of the solvent resistance and stress-cracking resistance of these high-glass-transition-temperature amorphous polymers is not adequate for all applications.

DETAILED DESCRIPTION OF THE INVENTION

It was an object of the present invention to provide a material which is based on polyarylene ethers and which has none of, or has a greatly reduced level of, the disadvantages mentioned.

A particular object of the present invention consisted in providing materials which have high stress-cracking resistance together with high impact resistance, high glass transition temperature, and high strength. The intention was to achieve an improvement over the solvent resistance and stress-cracking resistance of known polyarylene ether sulfones, without any significant impairment of mechanical properties.

The abovementioned objects are achieved via the polymer compositions of the invention, and via the process of the invention. Optimization of the structure of the known polyarylene ether block copolymers, and development of a novel production process, permitted improvement of the properties of the material over the available prior art.

Preferred embodiments are found in the claims and in the description below. Combinations of preferred embodiments are within the scope of the present invention.

The polyarylene ether block copolymers of the invention have a structure according to the general formula A-K—X—K-A, where —X— is a polyarylene ether segment with number-average molar mass of at least 5000 g/mol, and A- is a segment of the general structure $R^2NH$—$(R^1$—NH—CO—Ar—CO—NH$)_n$—$R^1$—NH—, in which $R^1$ is a linear or branched alkylene group having from 2 to 12 carbon atoms and Ar is an arylene group having from 6 to 18 carbon atoms, and $R^2$ is selected from aryloyl, alkyloyl, and H, and in which the number average of n is from 1 to 3, and there is a coupling group K of the structure —CO—$Ar^3$—CO— linking each A to X, in which $Ar^3$ is an aromatic group having from 6 to 18 carbon atoms.

Polyarylene Ether Segment X

X is preferably composed of repeat units of the general formula I:

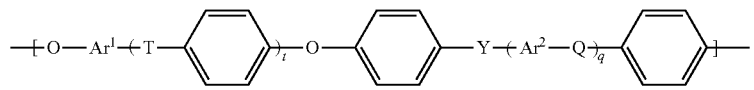

(I)

where the definitions are as follows:

t and q: independently of one another, 0, 1, 2, or 3,

Q, T, and Y: each, independently of one another, a chemical bond or group selected from —O—, —S—, —$SO_2$—, S=O, C=O, —N=N—, —$CR^aR^b$—, where each of $R^a$ and $R^b$, independently of the other, is a hydrogen atom or a $C_1$-$C_{12}$-alkyl, $C_1$-$C_{12}$-alkoxy, or $C_6$-$C_{18}$-aryl group, where at least one of Q, T, and Y is not —O—, and at least one of Q, T and Y is —$SO_2$—, and $Ar^1$ and $Ar^2$: independently of one another, an arylene group having from 6 to 18 carbon atoms.

The block X has bilateral linkage preferably by way of an oxygen atom to the coupling group K.

The number-average molar mass of the block X, which is at least 5000 g/mol, can vary widely. The number-average molar mass of X is preferably at least 10 000 g/mol, at least 15 000 g/mol, and particularly preferably at least 20 000 g/mol. A molar mass in said range has an advantageous effect on mechanical properties, in particular impact resistance and tensile strain at break. Number-average molar mass is determined for the purposes of the present invention by means of gel permeation chromatography in tetrahydrofuran as solvent using 0.1% of trifluoroacetic acid, against narrowly distributed polystyrene as standard.

If, under the abovementioned preconditions, Q, T, or Y is a chemical bond, that means that the group adjacent on the left-hand side and the group adjacent on the right-hand side have direct linkage to one another by way of a chemical bond.

However, it is preferable that Q, T, and Y in formula (I) are selected, independently of one another, from a chemical bond and from the functional groups —O— and —SO$_2$—, with the proviso that at least one of the group consisting of Q, T, and Y is —SO$_2$—.

If Q, T, or Y is —CR$^a$R$^b$—, each of R$^a$ and R$^b$ is, independently of the other, a hydrogen atom or a C$_1$-C$_{12}$-alkyl, C$_1$-C$_{12}$-alkoxy, or C$_6$-C$_{18}$-aryl group.

Preferred C$_1$-C$_{12}$-alkyl groups comprise linear and branched, saturated alkyl groups having from 1 to 12 carbon atoms. Particular mention may be made of the following moieties: C$_1$-C$_6$-alkyl moiety, such as methyl, ethyl, n-propyl, isopropyl, n-butyl, sec-butyl, 2- or 3-methylpentyl, and longer-chain moieties, such as unbranched heptyl, octyl, nonyl, decyl, undecyl, lauryl, and the singly branched or multibranched analogs thereof.

Possible alkyl moieties in the abovementioned C$_1$-C$_{12}$-alkoxy groups that can be used are the alkyl groups defined above having from 1 to 12 carbon atoms. Cycloalkyl moieties that can be used preferably comprise in particular C$_3$-C$_{12}$-cycloalkyl moieties, such as cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, -trimethyl.

Ar$^1$ and Ar$^2$ are, independently of one another, a C$_6$-C$_{18}$-arylene group. Ar$^1$ is preferably derived from an electron-rich aromatic substance which is readily susceptible to electrophilic attack and which preferably is selected from the group consisting of hydroquinone, resorcinol, dihydroxynaphthalene, in particular 2,7-dihydroxynaphthalene, and 4,4'-bisphenol. Ar$^1$ is preferably an unsubstituted C$_6$- or C$_{12}$-arylene group.

Possible C$_6$-C$_{18}$-arylene groups Ar$^1$ and Ar$^2$ are in particular phenylene groups, such as 1,2-, 1,3-, and 1,4-phenylene, naphthylene groups, such as 1,6-, 1,7-, 2,6-, and 2,7-naphthylene, and also the arylene groups derived from anthracene, from phenanthrene, and from naphthacene.

It is preferable that Ar$^1$ and Ar$^2$ in the preferred embodiment according to formula (I) are selected independently of one another from the group consisting of 1,4-phenylene, 1,3-phenylene, naphthylene, in particular 2,7-dihydroxynaphthylene, and 4,4'-bisphenylene.

Preferred repeat units according to formula I are those which comprise at least one of the following structural repeat units Ia to Io:

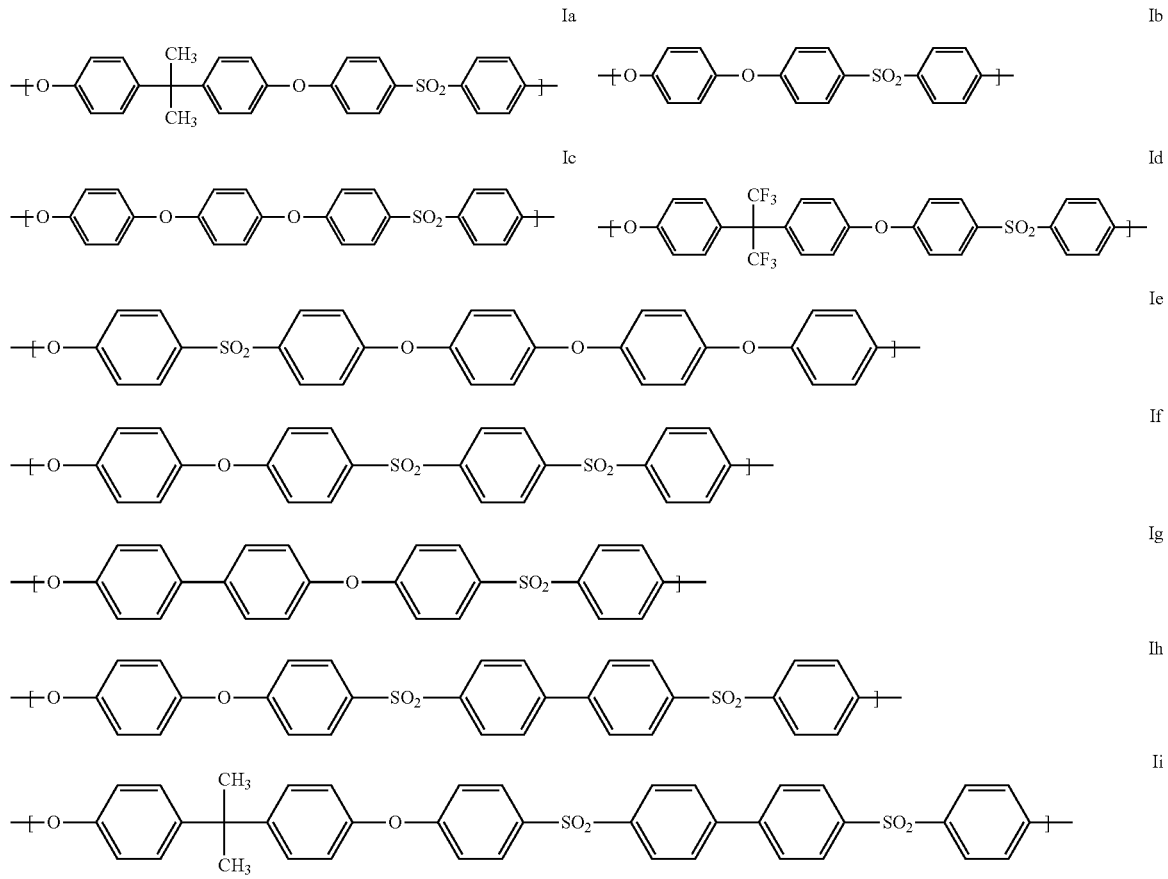

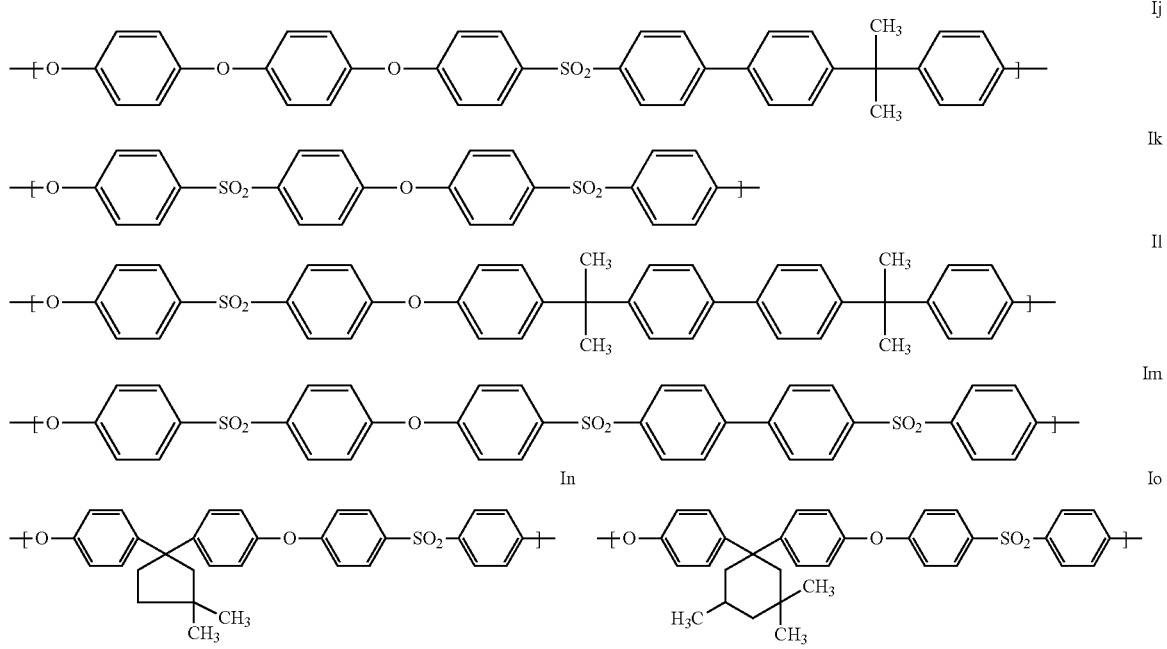

In addition to the units Ia to Io that are preferably present, preference is also given to those units in which one or more 1,4-dihydroxyphenyl units have been replaced by resorcinol units or by dihydroxynaphthalene units.

Particularly preferred units of the general formula I are the units Ia, Ig, and Ik. It is moreover particularly preferable that the polyarylene ethers consist essentially of one type of unit of the general formula I, in particular of one unit selected from Ia, Ig, and Ik. For the purposes of the present invention, polyarylene ether sulfones based on the units Ia, Ig, or Ik are termed polysulfone (PSU), polyphenylene sulfone (PPSU), and, respectively, polyether sulfone (PESU).

In one particularly preferred embodiment, $Ar^1$=1,4-phenylene, t=1, q=0, T=—C(CH$_3$)$_2$—, and Y=SO$_2$. This structure corresponds to polysulfone (PSU).

Segment A

According to the present invention, A- is a segment of the general structure $R^2$NH—($R^1$—NH—CO—Ar—CO—NH)$_n$—$R^1$—NH—, in which
$R^1$ is a linear or branched alkylene group having 2 to 12 carbon atoms, and
Ar is an arylene group having from 6 to 18 carbon atoms, $R^2$ is selected from aryloyl, alkyloyl, and H,
in which the number average of n is from 1 to 3, and
where there is a coupling group K of the structure —CO—$Ar^3$—CO— linking each A to X, in which $Ar^3$ is an arylene group having from 6 to 18, preferably 6 to 12, carbon atoms.

$R^1$ is preferably a linear or branched aliphatic hydrocarbon group, i.e. alkylene group, having from 2 to 8 carbon atoms, in particular a linear aliphatic hydrocarbon group having from 2 to 8 carbon atoms.

$R^1$ is particularly preferably ethylene, n-propylene, isopropylene, n-butylene, dimethylpropylene, n-pentylene, n-hexylene (hexamethylene), n-octylene, or n-dodecylene. $R^1$ is very particularly preferably hexamethylene.

Ar, like $Ar^3$, is preferably 1,4-phenylene, 1,2-phenylene, 1,3-phenylene, 1,4-naphthylene, 1,8-naphthylene, or 2,2'-, 2,4'-, or 4,4'-biphenylene. Ar is preferably 1,4-phenylene.

It is particularly preferable that $R^1$ is a linear aliphatic hydrocarbon group (alkylene group) having from 2 to 8 carbon atoms and that Ar is 1,4-phenylene.

The number average of n is preferably from 1 to 2, in particular in essence 1. It is particularly preferable that n is 1. This leads to low polydispersity of the corresponding segments and to particularly high crystallinity, and also to advantageous properties.

In one first preferred embodiment, $R^2$ is aryloyl or alkyloyl. The term aryloyl characterizes an aromatic hydrocarbon group linked to a carbonyl group (aryl-CO—). The term alkyloyl characterizes an aliphatic hydrocarbon group linked to a carbonyl group (alkyl-CO—). It is, of course, also possible to use araliphatic groups linked to a carbonyl group (araliphatic system —CO—).

The use of the abovementioned groups $R^2$ (aryloyl or alkyloyl) has the advantage that the additional amide group thus present gives an improvement in thermal stability and an increase in the melting point of the fundamental segments A, the result of this being a larger temperature difference relative to Tg of the segment X. This advantageously gives the melt more time to crystallize. It is particularly preferable that $R^2$ is aryloyl.

Preferred aryloyl groups have the structure Ar—CO—, where Ar is defined as above. When the same group Ar is used in the aryloyl group and in the "interior" of the segment A, the structural similarity gives improved tendency toward crystallization and leads to particularly good stress-cracking resistance and particularly good solvent resistance. The aryloyl group can in principle be based on an aromatic group having from 6 to 18 carbon atoms, in particular form 6 to 12 carbon atoms.

Preferred examples of aryloyl are benzyloyl, naphthyloyl, and phenylpropionyl.

Preferred alkyloyl groups have the structure $R^4$—CO—. $R^4$ can in principle be a linear or branched alkyl group having from 1 to 20 carbon atoms, in particular from 2 to 10 carbon atoms, preferably from 3 to 8 carbon atoms.

Preferred examples of alkyloyl are butyryl, valeryl, hexanoyl, heptanoyl, octanoyl, nonanoyl, decanoyl, and cyclohexanecarbonyl.

It is preferable for the purposes of this first embodiment that $R^2$ is benzoyl.

In a second preferred embodiment, $R^2$ is H. This embodiment is advantageous because of an easy production process together with satisfactory thermal stability. However, the first abovementioned embodiment is preferred over the second embodiment ($R^2$=H) for the abovementioned reasons.

A person skilled in the art is aware of abovementioned segments A, and these are described on pages 7043 to 7053 in Krijgsman et al., Polymer 44 (2003); the entire content of those pages is hereby incorporated herein by way of reference. The segments described in that document, which are termed xTx, can advantageously be used for the purposes of the present invention. "x" here characterizes an alkylene group having x methylene groups (i.e. 6=hexamethylene, etc.).

According to the invention, the coupling group has the structure K—CO—$Ar^3$—CO—, where $Ar^3$ is an arylene group having from 6 to 18 carbon atoms. $Ar^3$ can be defined as for Ar.

It is preferable that Ar=$Ar^3$. This gives the respective units increased structural similarity. This leads to higher crystallinity and to improved solvent resistance and improved stress-cracking resistance, while mechanical properties are unchanged.

The coupling group K is preferably —CO-1,4-phenylene-CO—. This promotes a high level of formation of crystal nuclei, leading to particularly high stress-cracking resistance.

Processes for the production of the polyarylene ether block copolymers of the invention According to the invention, the process for the production of the polyarylene ether block copolymers of the invention comprises the following steps:
(a) provision of at least one polyarylene ether X*, which is composed of repeat units as defined for the purposes of the polyarylene ether block copolymers of the invention and in essence has phenolate end groups or phenolic end groups, and of an amide segment A* of the structure $NH_2$—($R^1$—NHCO—Ar—CO—NH)$_n$—$R^1$—$NH_2$, where the definitions are as defined for the purposes of the polyarylene ether block copolymers of the invention, and then
(b) coupling of X* and A* in a stoichiometric ratio of 1 mol of X* to 2 mols of A* with a coupling agent K* which has the structural element —CO—Ar—CO—, where Ar is as defined for the purposes of the polyarylene ether block copolymers of the invention.

It is obvious to a person skilled in the art that the symbols X*, A*, and K* correspond to the structures X, A, and K of the polyarylene ether block copolymers of the invention additionally having suitable end groups which are reactive in the process of the invention. A person skilled in the art is aware of end groups of this type. It may be noted that A* also differs from A in that $R^2$ is H. The latter group can be converted via subsequent reaction into $R^2$=aryloyl or alkyloyl, see below.

For the purposes of the present invention, phenolate end groups are negatively charged oxygen atoms bonded to an aromatic ring and taking the form of an end group. Said end groups derive from the phenolic end groups via removal of a proton. For the purposes of the present invention, a phenolic end group is a hydroxy group bonded to an aromatic ring.

The meaning of the expression "in essence has phenolate end groups or phenolic end groups" is that at least 80% (i.e. at least 80 in 100) of the end groups present are either phenolate end groups or phenolic end groups.

It is preferable that at least 85% of the end groups of the polyarylene ether X* are phenolate end groups or phenolic end groups, in particular at least 90%, particularly at least 95%, very particularly at least 98%.

The preferred method of determining the proportion of phenolate end groups or phenolic end groups uses determination in the form of OH end groups by means of potentiometric titration, with determination of the organically bonded halogen end groups by atomic spectroscopy, and then calculation of the respective numerical proportions in %. A person skilled in the art is aware of appropriate methods. As an alternative, $^{13}$C nuclear spin resonance spectroscopy can be used to determine the proportions of the respective end groups.

A person skilled in the art is aware that phenolate end groups have relatively high reactivity in the formation of amide groups. If phenolic end groups are present, a person skilled in the art will therefore prefer to use prior or in-situ addition of a base to convert some or all of these into phenolate end groups.

Preferred segments X* therefore have repeat units as defined for the purposes of X, where the end groups are phenolate end groups or phenolic end groups. The simplified term OH-terminated polyarylene ether is used hereinafter for polyarylene ethers of this type.

The production of OH-terminated polyarylene ethers is sufficiently well known to those skilled in the art. The general method of producing OH-terminated polyarylene ethers uses nucleophilic polycondensation of aromatic dihalogen compounds and of aromatic dihydroxy compounds in a dipolar aprotic solvent (preferably N-methylpyrrolidone) and potassium carbonate as base. A molar excess of the aromatic dihydroxy compound is used here, the usual amount being from 1.05 to 1.08 mol in relation to 1 mol of the aromatic dihalogen compound.

In one first preferred embodiment, the OH-terminated polyarylene ethers can be used immediately in the form of reaction products dissolved in the solvent (S), without further work-up. This variant has the advantage of particularly simple process technology.

In a second preferred embodiment, the OH-terminated polyarylene ethers are obtained in pure form via work-up. This type of work-up is preferably filtration and subsequent precipitation in water or in a mixture composed of water and N-methylpyrrolidone.

The proportion of the phenolic end groups in the polyarylene ethers used is preferably at least 0.1% by weight of OH, calculated as amount of OH by weight, based on the total amount of the polymer composition, in particular at least 0.12% by weight, particularly preferably at least 0.15% by weight.

Potentiometric titration is used to determine the phenolic end groups in the form of amount by weight of OH, based on the total amount of the polyarylene ether. For this, the polymer is dissolved in dimethylformamide and titrated with a solution of tetrabutylammonium hydroxide in toluene/methanol. The endpoint is detected potentiometrically.

The preferred method of producing the amide segments A* uses reaction between an appropriate diacid and an appropriate diamine, using an excess of diamine which is preferably from 3:1 to 10:1, in particular from 6:1 to 8:1. The product is then precipitated, washed, and recrystallized. This method can give a particularly uniform product.

The amide segments A* are preferably produced here in the form of segments of the general formula $H_2N-R^1-NH-CO-Ar-CO-NH-R^1-NH_2$, where $R^1$ and Ar are defined as above.

The production of suitable amide segments A* is described on pages 7043 to 7053 in Krijgsman et al., Polymer 44 (2003).

According to step (b) of the process according to the invention, coupling of X* and A* takes place in a stoichiometric ratio of 1 mol of X* to 2 mol of A* by using a coupling agent K*, which comprises the structural element $-CO-Ar^3-CO-$ as defined for the purposes of the polyarylene ether block copolymers of the invention.

The coupling takes place here via chemical reaction of X*, A*, and K*. In one first embodiment, X* is reacted in a first step with K*. This can give reactive polyarylene ethers having modified end groups. The reaction preferably takes place in the presence of a base, preferably an aliphatic amine, in particular N-ethyldiisopropylamine. The reaction of the resultant product with A* then takes place in a second step.

It is essential for the invention that a stoichiometric ratio of 1 mol of X* to 2 mol of A* is used for the coupling of X* and A*. This results in formation of the triblock copolymers of the invention. The stoichiometric ratio of 1 mol of X* to 2 mol of A* is preferably achieved by using from 1.9 to 2.15 mol of A* per mole of X*. Particular preference is given to a ratio of from 1.95 to 2.05 mol of A* per mole of X*.

In a second preferred embodiment, A* is reacted in a first step with K*. This gives modified amide segments. The reaction with X* then takes place in a second step.

Possible end groups of the coupling agent K* having the structural element $-CO-Ar^3-CO-$ are end groups which are reactive toward amine groups and toward hydroxy groups.

Suitable reactive end groups are in particular anhydrides and acyl halides, in particular acyl chlorides. The coupling agent K* is preferably an acyl dichloride. It is particularly preferable that the coupling agent K is terephthaloyl dichloride.

In one preferred embodiment, after step (b), the reaction of the resultant reaction product with a compound of the structure Ar—CO—Cl— takes place according to step (c), where Ar is defined as above.

It is preferable that the polyarylene ether block copolymer is then obtained as a solid according to step (d) of the process of the invention.

In principle, there are various possible processes for obtaining the material as a solid. However, preference is given to obtaining the polyarylene ether block copolymer via precipitation.

The preferred precipitation can in particular take place via mixing of the solvent (S) with a poor solvent (S'). A poor solvent is a solvent in which the polyarylene ether block copolymer is not soluble. This type of poor solvent is preferably a mixture composed of a nonsolvent and a solvent. A preferred nonsolvent is water. A preferred mixture (S') composed of a solvent with a nonsolvent is preferably a mixture composed of the solvent (S), in particular N-methyl-4-pyrrolidone, and water. It is preferable that the polymer solution from step (b) or step (c) is added to the poor solvent (S'), with consequent precipitation of the polymer composition. It is preferable here to use an excess of the poor solvent. It is particularly preferable that the polymer solution from step (b) or step (c) is added in finely dispersed form, in particular in droplet form.

If the poor solvent (S') used comprises a mixture composed of the solvent (S), in particular N-methyl-2-pyrrolidone, and a nonsolvent, in particular water, a preferred solvent:nonsolvent mixing ratio is then from 1:2 to 1:100, in particular from 1:3 to 1:50.

Particularly efficient precipitation takes place if the content of the polyarylene ether block copolymer in the solvent (S), based on the total weight of the mixture composed of polymer composition and solvent (S), is from 10 to 50% by weight, preferably from 15 to 35% by weight.

The polyarylene ether block copolymer is purified by methods known to a person skilled in the art, an example being washing with suitable solvents in which the polyarylene ether block copolymers of the invention are preferably substantially insoluble.

The invention further provides polymer compositions comprising a polyarylene ether block copolymer of the invention. The polyarylene ether block copolymers of the invention are particularly suitable for the production of moldings, of films, of fibers, or of foams.

The structure of the invention achieves a particularly advantageous combination of favorable mechanical properties and an improved solvent resistance. The triblock-copolymer structure permits maximization of the crystalline fraction in the material for a given molecular weight of the segment X. At the same time, high molecular weights of the segment X are advantageous for producing good mechanical properties.

The examples below provide further illustration of the invention but do not restrict the same.

EXAMPLES

The intrinsic viscosity of the polyarylene ethers was determined in 1% strength N-methylpyrrolidone solution at 25° C. to DIN EN ISO 1628-1.

Mechanical testing: Impact resistance tests were carried out to ISO 179-2/1eU (without notch) and ISO 179-2/1eA (with notch) ("Charpy impact resistance"). Tensile tests were performed to ISO 527-2. The tensile test to ISO 527-2 was used to determine tensile strain at break and yield point, and also modulus of elasticity E.

Solvent resistance: Visual assessment was carried out after 24 h of storage of the respective material in the form of injection-molded specimens (dumbbell specimens with central portion of $80*10*4$ mm$^3$) at a temperature of 80° C. in the solvent FAM B.

Synthesis of OH-PSU-OH Having Mn=20 000 g/mol (Product PSU$_{20}$):

A polyaryl ether was obtained via nucleophilic aromatic polycondensation of 574.16 g of dichlorodiphenyl sulfone and 466.77 g of bisphenol A in 1053 ml of NMP, using 297.15 g of potassium carbonate. This mixture was kept at 190° C. under nitrogen for 6 hours. The mixture was then diluted by adding 1947 ml of NMP, the solid constituents were removed by filtration, and the polymer was isolated by precipitation in ¼ NMP/water. After careful washing with water, the product was dried for 12 h at 120° C. in vacuo. The intrinsic viscosity of the product was 40 ml/g.

Synthesis of OH-PSU-OH Having Mn=10 000 g/mol (Product PSU$_{10}$):

A polyaryl ether was obtained via nucleophilic aromatic polycondensation of 574.16 g of dichlorodiphenyl sulfone and 477.22 g of bisphenol A in 1053 ml of NMP, in the presence of 297.15 g of potassium carbonate. This mixture was kept at 190° C. under nitrogen for 6 hours. The mixture was then diluted by adding 1947 ml of NMP, the solid constituents were removed by filtration, and the polymer was isolated by precipitation in ¼ NMP/water. After careful washing with water, the product was dried for 12 h at 120° C. in vacuo. The intrinsic viscosity of the product was 27 ml/g.
Synthesis of an Amide segment 6T6:
696 g (6.0 mol) of 1,6-diaminohexane were used as initial charge and heated to 80° C. in a 4 l double-walled reactor with anchor stirrer, reflux condenser, and $N_2$ inertization. 145.5 g (0.75 mol) of dimethyl terephthalate were metered into the diamine and the mixture was stirred for 4 hours. The reaction medium was then cooled and diluted in 1.5 l of toluene. The product precipitated and was isolated by filtration. It was washed with hot toluene (80° C.) and isolated by filtration. This procedure was carried out 8 times. The process was then repeated twice with diethyl ether at room temperature. The filtercake was dried in vacuo overnight at 50° C.
Synthesis of a Segmented Triblock Copolymer 6T6T-PSU-T6T6 From the $PSU_{20}$ (Inventive Example 1):
500 g of the $PSU_{20}$ were dissolved in dichloromethane at 30° C. in the reactor. 19.4 g of N-ethyldiisopropylamine were metered into the solution. After 5 minutes, the terephthaloyl dichloride (10.2 g) dissolved in 250 ml of dichloromethane was metered into the system. After 15 minutes, 18.1 g of the 6T6 dissolved at 120° C. in 800 ml of NMP were metered into said reaction mixture. The mixture was then stirred at 90° C. for one hour. The dichloromethane was then removed by distillation with simultaneous dilution with NMP. The product was worked up by precipitating the copolymer in ¼ NMP/water. The product was carefully washed with water and dried for 2 days at 150° C. in vacuo. The intrinsic viscosity of the product was 84 ml/g.
Finally, the product was pelletized at 330° C. (barrel temperature) in a PTW16 twin-screw extruder and injection-molded to give tensile specimens.
Synthesis of a Segmented Triblock Copolymer 6T6T-PSU-T6T6 From the $PSU_{10}$ (Inventive Example 2):
500 g of the $PSU_{10}$ were dissolved in dichloromethane at 30° C. in the reactor. 38.7 g of N-ethyldiisopropylamine were metered into the solution. After 5 minutes, the terephthaloyl dichloride (20.3 g) dissolved in 250 ml of dichloromethane was metered into the system. After 15 minutes, 36.2 g of the 6T6 dissolved at 120° C. in 800 ml of NMP were metered into said reaction mixture. The mixture was then stirred at 90° C. for one hour. The dichloromethane was then removed by distillation with simultaneous dilution with NMP. The product was worked up by precipitating the copolymer in ¼ NMP/water. The product was carefully washed with water and dried for 2 days at 150° C. in vacuo. The intrinsic viscosity of the product was 68 ml/g.
Finally, the product was pelletized at 330° C. (barrel temperature) in a PTW16 twin-screw extruder and injection-molded to give tensile specimens.
Synthesis of a Segmented Multiblock Copolymer (PSU-T6T6)$_n$ From the $PSU_{10}$ (Comparative Example 3):
500 g of the $PSU_{10}$ were dissolved in dichloromethane at 30° C. in the reactor. 38.7 g of N-ethyldiisopropylamine were metered into the solution. After 5 minutes, the terephthaloyl dichloride (20.3 g) dissolved in 250 ml of dichloromethane was metered into the system. After 15 minutes, 18.1 g of the 6T6 dissolved at 120° C. in 800 ml of NMP were metered into said reaction mixture. The mixture was then stirred at 90° C. for one hour. The dichloromethane was then removed by distillation with simultaneous dilution with NMP. The product was worked up by precipitating the copolymer in ¼ NMP/water. The product was carefully washed with water and dried for 2 days at 150° C. in vacuo.
Finally, the product was pelletized at 330° C. (barrel temperature) in a PTW16 twin-screw extruder and injection-molded to give tensile specimens.
Synthesis of a Segmented Triblock Copolymer B6T6T-PSU-T6T6B (Inventive Example 4):
A polyarylene ether was obtained via nucleophilic aromatic polycondensation of 389.3 g of dichlorodiphenyl sulfone and 316.5 g of bisphenol A in 714 ml of NMP, in the presence of 201.5 g of potassium carbonate. Said mixture was kept at 190° C. under nitrogen for 6 hours. The mixture was then diluted by adding 1036 ml of NMP.
23.26 g of N-ethyldiisopropylamine were metered into the solution of PSU in NMP. After 5 minutes, the terephthaloyl dichloride (12.18 g) dissolved in 250 ml of dichloromethane was metered into the system. After 15 minutes, 21.75 g of the 6T6 dissolved at 120° C. in 500 ml of NMP were metered into this reaction mixture. The mixture was then stirred at 80° C. for 1 hour. The reaction mixture was then cooled to 30° C. 8.43 g of benzoyl chloride were metered into the system. After 30 minutes, the solution was diluted with 500 ml of NMP.
The product was worked up via filtration to remove the solid constituents and precipitation of the copolymer in ¼ NMP/water. The product was carefully washed with water and dried for 2 days at 150° C. in vacuo. The intrinsic viscosity of the product was 51 ml/g.
Finally, the product was pelletized at 325° C. (barrel temperature) in a ZSK18 twin-screw extruder and then compounded with 40% of glass fiber at 330° C. (barrel temperature) in a ZSK30 twin-screw extruder, and injection-molded to give tensile specimens.
The corresponding values were determined for the following materials as comparative examples:
Comparative example 5: PSU-type polysulfone with number-average molar mass of 18 500 g/mol (determined by means of gel permeation chromatography) with 40% by weight of glass fibers.
Comparative example 6: PSU-type polysulfone with number-average molar mass of 18 500 g/mol (determined by means of gel permeation chromatography).
The materials of the abovementioned examples were subjected to a stress-cracking resistance test, by storing tensile specimens (dumbbell specimens with central section of 80*10*4 mm$^3$) in FAM B at 80° C. for 24 h. The specimens were then assessed visually. A criterion here was the dimensional stability of the tensile specimen under the conditions of the test since it is a semiquantitative reflection of solvent resistance.

| Example | Stress-cracking resistance (24 h, 80° C., FAM B)[3] | Charpy impact resistance | | ISO 527-2 tensile test | | |
|---|---|---|---|---|---|---|
| | | $a_k$ (kJ/m$^2$) | $a_n$ (kJ/m$^2$) | E (MPa) | $\sigma_y$ (MPa)[2] | $\epsilon_B$ (%)[2] |
| 1 | ++ | 5.7 | 346 | 2726 | 79 | 34 |
| 2 | + | 3.5 | 86 | 2714 | 81[1] | 3-10 |

| Example | Stress-cracking resistance (24 h, 80° C., FAM B)[3] | Charpy impact resistance | | ISO 527-2 tensile test | | |
|---|---|---|---|---|---|---|
| | | $a_k$ (kJ/m$^2$) | $a_n$ (kJ/m$^2$) | E (MPa) | $\sigma_y$ (MPa)[2] | $\epsilon_B$ (%)[2] |
| comp 3 | − | 4 | 94 | 2700 | 70[1] | 3-10 |
| 4 | + | 3.2 | 20.2 | 12 460 | 128 | 1.3 |
| comp 5 | − | 8 | 40 | 13 500 | 146 | >1.5 |
| comp 6 | − | 6 | 400 | 2600 | 65 | 20-50 |

[1] Half of the specimens fractured prior to the yield point (brittle fracture).
[2] $\sigma_y$ and $\epsilon_B$ here represent yield point and, respectively, tensile strain at break.
[3] Stress-cracking resistance: ++ = slight swelling, but dimensionally stable; + = swelling, but in essence dimensionally stable; − = severe swelling, not dimensionally stable

The invention claimed is:

1. A polyarylene ether block copolymer of the structure A-K—X—K-A, wherein
X— is a polyarylene ether segment with number-average molar mass of at least 5000 g/mol, and
A- is a segment of the general structure $R^2$NH—($R^1$—NH—CO—Ar—CO—NH)$_n$—$R^1$—NH—, in which $R^1$ is a linear or branched alkylene group having from 2 to 12 carbon atoms and Ar is an arylene group having from 6 to 18 carbon atoms, and $R^2$ is selected from aryloyl, alkyloyl, and H, and in which the number average of n is from 1 to 3, and
wherein there is a coupling group K of the structure —CO—Ar$^3$—CO— linking each A to X, in which Ar$^a$ is an aromatic group having from 6 to 18 carbon atoms.

2. The polyarylene ether block copolymer according to claim 1, wherein X is composed of repeat units of the general formula I

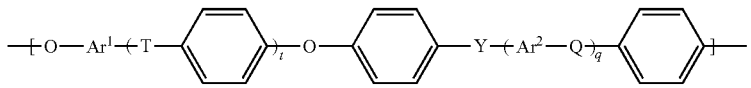

(I)

where the definitions are as follows:
t and q are independently of one another, 0, 1, 2, or 3,
Q, T, and Y are each, independently of one another, a chemical bond or —O—, —S—, —SO$_2$—, S═O, C═O, —N═N—, —CR$^a$R$^b$—,
wherein each of R$^a$ and R$^b$, independently of the other, is a hydrogen atom, a $C_1$-$C_{12}$-alkyl, $C_1$-$C_{12}$-alkoxy, or $C_6$-$C_{18}$-aryl group,
wherein at least one of Q, T, and Y is not —O—, and at least one of Q, T and Y is —SO$_2$—, and
Ar$^1$ and Ar$^2$ are independently of one another, an arylene group having from 6 to 18 carbon atoms.

3. The polyarylene ether block copolymer according to claim 1, wherein X is a polyarylene ether sulfone based on bisphenol A.

4. The polyarylene ether block copolymer according to claim 1, wherein X is a polysulfone (PSU).

5. The polyarylene ether block copolymer according to claim 1, wherein X has a number-average molar mass of at least 15 000 g/mol.

6. The polyarylene ether block copolymer according to claim 1, wherein $R^1$ is hexamethylene.

7. The polyarylene ether block copolymer according to claim 1, wherein Ar and Ar$^3$ are 1,4-phenylene.

8. The polyarylene ether block copolymer according to claim 1, wherein the number average of n is from 1 to 2.

9. The polyarylene ether block copolymer according to claim 1, wherein n=1.

10. The polyarylene ether block copolymer according to claim 1, wherein the coupling group K is —CO-1,4-phenylene-CO—.

11. The polyarylene ether block copolymer according to claim 1, wherein $R^2$ is benzoyl or H.

12. A process for the production of the polyarylene ether block copolymers according to claim 1, comprising:
(a) providing at least one polyarylene ether X*, which is composed of repeat units and in essence has phenolate end groups or phenolic end groups, and of an amide segment A* of the structure NH$_2$—($R^1$—NHCO—Ar—CO—NH)$_n$—$R^1$—NH$_2$, and then
(b) coupling X* and A* in a stoichiometric ratio of 1 mol of X* to 2 mols of A* with a coupling agent K* which has the structural element K.

13. The process according to claim 12, wherein the coupling agent K* is an acyl dichloride.

14. The process according to claim 12, wherein the coupling agent K* is terephthaloyl dichloride.

15. The process according to claim 12, wherein at least 80% of the end groups of the polyarylene ether X* are phenolate end groups or phenolic end groups.

16. The process according to claim 12, wherein, following step (b), in step (c) reacting the resultant reaction product with a compound of the structure Ar—CO—Cl, in which Ar is an arylene group having from 6 to 18 carbon atoms.

17. A polymer composition comprising a polyarylene ether block copolymer according to claim 1.

18. A molding, film, fiber, or foam comprising the polyarylene ether block copolymers according to claim 1.

* * * * *